United States Patent [19]
Monji et al.

[11] Patent Number: 5,284,501
[45] Date of Patent: Feb. 8, 1994

[54] METHOD OF MANUFACTURING GLASS OPTICAL ELEMENT

[75] Inventors: Hideto Monji, Katano; Kiyoshi Kuribayashi, Neyagawa; Makoto Umetani, Hirakata; Noriyuki Kawata, Omiya, all of Japan

[73] Assignees: Sumita Optical Glass, Inc., Tokyo; Matsushita Electric Industrial Co., Ltd., Osaka, both of Japan

[21] Appl. No.: 932,228

[22] Filed: Aug. 19, 1992

Related U.S. Application Data

[60] Division of Ser. No. 866,265, Apr. 10, 1992, Pat. No. 5,171,347, which is a continuation of Ser. No. 460,554, Jan. 3, 1990, abandoned.

[30] Foreign Application Priority Data

| Jan. 13, 1989 | [JP] | Japan | 1-7249 |
| Feb. 28, 1989 | [JP] | Japan | 1-47629 |
| Mar. 30, 1989 | [JP] | Japan | 1-80371 |

[51] Int. Cl.⁵ .................................. C03B 11/00
[52] U.S. Cl. ........................... 65/32.5; 65/64; 65/66; 65/102; 264/2.7
[58] Field of Search ............ 65/32.5, 66, 72, 102, 65/109, 111, 122, 127, 227, 64, 305; 264/2.7

[56] References Cited

U.S. PATENT DOCUMENTS

| 2,339,975 | 10/1941 | Blau | 65/305 |
| 2,994,161 | 8/1961 | Bair | 65/72 |
| 3,162,522 | 12/1964 | Tingley | 65/122 |
| 3,230,063 | 1/1966 | Copeland | 65/122 |
| 3,244,497 | 4/1966 | Copeland | 65/26 |
| 3,351,449 | 11/1967 | Ambrogi | 65/122 |
| 3,414,454 | 12/1968 | Long | 65/99.2 |
| 4,002,451 | 1/1977 | Knapp et al. | 65/303 |
| 4,507,136 | 3/1985 | Northup | 65/79 |
| 4,629,487 | 12/1986 | Monji et al. | 65/26 |
| 4,734,118 | 3/1988 | Marechal et al. | 65/102 |
| 4,854,958 | 8/1989 | Marechal et al. | 65/64 |
| 4,921,519 | 5/1990 | Schinker et al. | 65/66 X |
| 5,013,348 | 5/1991 | HirOta | 65/374.13 |

FOREIGN PATENT DOCUMENTS

| 855763 | 7/1949 | Fed. Rep. of Germany . |
| 54-60312 | 5/1979 | Japan . |
| 54-39846 | 11/1979 | Japan . |
| 64-24024 | 1/1989 | Japan . |
| 64-52619 | 2/1989 | Japan . |

OTHER PUBLICATIONS

Patent Abstracts of Japan, unexamined applications C Field, vol. 10, No. 139, May 22, 1986 ref. Kokai-no. 60-264 333.

Primary Examiner—Robert L. Lindsay
Attorney, Agent, or Firm—Wenderoth, Lind & Ponack

[57] ABSTRACT

The invention provides a method of manufacturing extremely precise glass optical element by thermally deforming optical glass on the optical surf ace of a thermal processing jig coated with chemically stable thin film, followed by the molding of optical glass preform having free surf ace on one side and transcribed surface from the optical surface of the thermal processing jig by means of a press mold which thermally presses the optical glass preform.

2 Claims, 3 Drawing Sheets

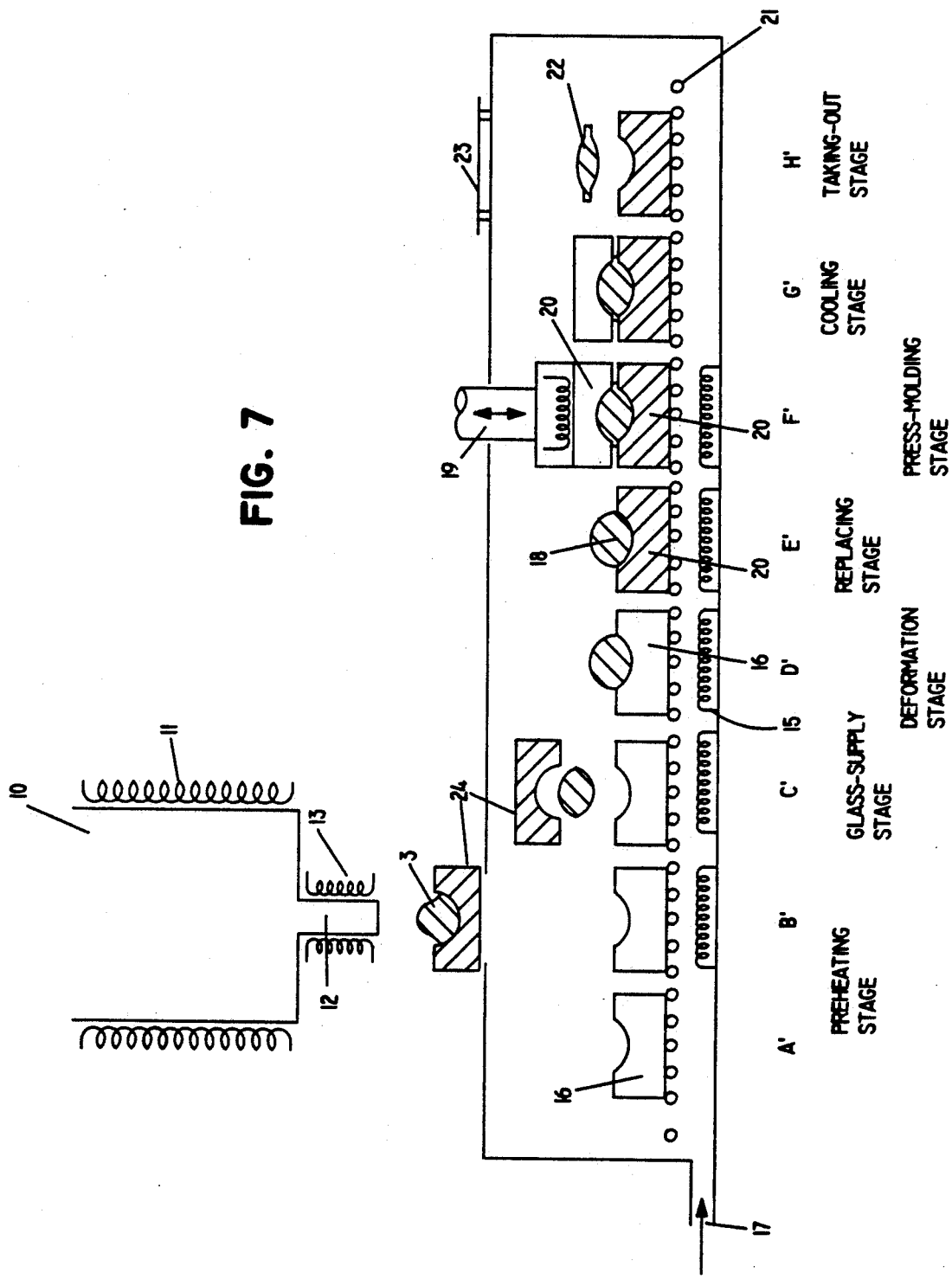

METHOD OF MANUFACTURING GLASS OPTICAL ELEMENT

This is a Rule 60 Divisional of Ser. No. 07/866,265 filed Apr. 10, 1992 now U.S. Pat. No. 5,791,347, which is a Rule 62 Continuation of Ser. No. 07/460,554 filed Jan. 3, 1990 and now abandoned.

BACKGROUND OF THE INVENTION

1. Field of the Invention

The present invention relates to a method of manufacturing extremely precise glass optical elements such as lenses and prism and to glass optical element preform molded by reheating processes.

2. Description of the Prior Art

Recently, glass optical elements have significantly tended to have an aspherical surface to allow manufacturers to simultaneously achieve simple construction and light weight of lenses f or use with optical apparatuses. Since any of the conventional polishing methods for manufacturing optical lenses involves difficulty in the processing and mass production of these aspherical lenses, molding a process using a mold is considered to be quite promising as was disclosed in the U.S. Pat. No. 3,900,328, U.S. Pat. No. 4,139,677, and the U.S. Pat. No. 4,168,961, for example. The proposed molding process using mold thermally molds a roughly shaped opticalglass material by applying a non-spherical mold complete with the desired surface quality and surface accuracy or thermally molds a gob of optical glass.

When manufacturing glass optical elements like aspherical lenses and prisms by molding via recurrent thermal processes, it is essential for the manufacturers to use the molded glass optical preform perfectly free from minimal concave and convex surfaces or scratches on the surface, i.e., the molded glass optical preform must have a perfect mirror surface having a maximum of 0.005 microns of the surface roughness (RMS) for example. As was cited in U.S. Pat. No. 4,139,677 and the Japanese Laid-Open Patent Publication No. 59-116137 of 1984 for example, melted glass was thus far directly molded by a mold or ground and polished before eventually yielding a conventional optical glass preform. As a result, a variety of complicated steps were needed for grinding and polishing melted glass to result in high cost. On the other hand, there is a conventional art which directly receives melted glass by initially coating with a carbon layer of a parting agent by generating vapor-phase reaction on the mold like molding plate or pressurized mold before eventually processing glass heated to high temperature. Typically, this art was proposed by the Japanese Laid-Open Patent Publication No. 54-60312 of 1979 for example. However, since this prior art merely produced porous and uneven film of carbon layer of parting agent, a variety of problems occurred. For example, residual parting agent easily adhered to the glass surface. As a result, glass surface could not achieve perfect mirror surface having a maximum of 0.005 microns (RMS) of surface roughness. Furthermore, very fine concave and convex surfaces were also generated on the glass surface. In addition, as a result of oxidation and wear of the carbon layer, life of the mold itself became short.

SUMMARY OF THE INVENTION

An object of the invention is to provide a novel method of manufacturing extreme precise glass optical elements like lens and prism and provide a novel optical glass preform ideally suited for recurrent heating processes.

To achieve the above object, the invention provides a novel method of manufacturing glass optical elements including a process for manufacturing an optical glass preform by thermally deforming optical glass on the optical surface of a thermal processing jig in a non-oxidizing atmosphere and another process for molding the thermally deformed optical glass preform with a press mold under thermally pressurized condition.

When an optical glass placed on an optical surface of a thermal processing jig coated with a chemically stable thin film is heated, the surface of the optical glass in contact with the optical surface of the thermal- processing jig slowly deforms into a shape transcribed from the optical surface of the thermal processing jig, whereas the other surface without being in contact with the optical surface of the thermal processing jig forms a free surface by effect of the surface tension of the glass. As a result of the thermal deformation of optical glass, one surface makes up the transcribed surface transcribed from the optical surface of the thermal processing jig, whereas the other surface makes up the free surface. Glass optical elements featuring extremely high surf ace quality and surf ace accuracy can be manufactured by thermally molding the optical glass preform with a press mold having desired shape and optical surface.

According to the invention, each of the thermal processing jig and the press mold is coated with a chemically stable thin film and provided with desired shape and optical surface. The chemically stable thin film may comprise a single element of noble metal or tungsten or tantalum or rhenium or hafnium or an alloy of at least two of these elements. Any of these elements neither reacts nor adheres to the optical glass under a non-oxidizing atmosphere. Homogeneous and thick films can solidly be formed on the thermal processing jig and the press mold by applying either sputtering process, ion-plating process, or plating. As a result, perfect mirror surface having a maximum of 0.005 microns (RMS) of the surface roughness can be generated without exfoliation of film and generation of fine concave and convex over the glass surface. It is possible for the invention to form the above film not only on the optical surface, but also over the entire surface of the thermal processing jig and the-press mold.

By thermally deforming and molding optical glass with the thermal processing jig and the press mold mentioned above, the embodiments of the invention can very easily manufacture optical glass preforms and glass optical elements completely free from even the minimal concave and convex surfaces or scratch on the entire surfaces in the perfect mirror surface with a maximum of 0.005 microns (RMS) of the surface roughness.

The object of the invention can be achieved also by embodying the method of manufacturing a glass optical element desirably including the following: a process which allows a first thermal processing jig to receive melted glass; a process which moves the melted- glass onto a second thermal processing jig by inverting (by making upside down) the melted glass in the non-oxidizing atmosphere; a process for manufacturing an optical glass preform by thermally deforming the melted glass- on the optical surface of the second thermal processing jig; and a process which thermally molds the thermally deformed optical glass preform with a pair of press molds.

The surface of the melted glass quickly cools and generates thin skin. Since inner part of the melted glass still has high temperature, internal viscosity still remains low and the interior being extremely fluid. If the melted glass were treated with the thermal processing jig at a low temperature, in particular, if the first thermal processing jig at the low temperature receives the melted glass, chill wrinkles remain on the surface of the melted glass in contact with the first thermal processing jig, whereas the surface out of contact with the first thermal processing jig remains free by effect of the surface tension of glass. When moving the melted glass onto the second thermal processing jig by making upside down the melted glass in the non-oxidizing condition, the free surface of the melted glass comes into contact with the second thermal processing jig, whereas the surface of the melted glass in contact with the first thermal processing jig does not come into contact with the second thermal processing jig, but it remains free. Compared to the moment immediately after being extruded from the nozzle, temperature of the melted glass has become lower, and thus, no chill wrinkle can be generated on the surface of the melted glass which is in contact with the second thermal processing jig. When thermally deforming the melted glass on the optical surface of the second thermal processing jig in the above condition, the glass surface in contact with the optical surface of the second thermal processing jig slowly deforms into a transcribed shape of the optical surface of the second thermal processing jig, whereas the surface without being in contact with the optical surface of the second thermal processing jig forms free surface by effect of surface tension of glass. In this way, an optical glass preform having one surface being transcribed from the optical surface of the thermal processing jig and the other surface being free can be manufactured. The prepared glass preform is then thermally molded between a pair of press molds each having desired shape and optical surface so that a glass optical element having extremely high surface quality and surface accuracy can eventually be manufactured.

To embody the invention, the first thermal processing jig having poor wettability with melted glass may be used. Carbon, graphite, glassy carbon, boron nitride, stainless steel, nickel-radical alloy, etc. are poor in the wettability with melted glass. Each of the second thermal processing jig and the press mold may be coated with a chemically stable thin film and provided with desired shape and optical surface. Chemically stable thin film may comprises a noble metal or tungsten or rhenium or hafnium or an alloy of at least two of these elements. Homogeneous and thick films can solidly be formed by applying either the process, or ion-plating, or plating process using the second thermal processing jig and the press mold. As a result, perfect mirror surface having a maximum of 0.005 micron (RMS) of the surface roughness can be achieved without exfoliation of film and fine concave and convex surfaces on the glass surface.

A non-oxidizing atmosphere is generated by presence of inert gas such as nitrogen gas, argon, or helium, or by properly blending inert gas with appropriate volume of hydrogen, or carbon oxide like carbon monooxide or carbon dioxide, hydrocarbons like methane, ethane, ethylene, or toluene, halogenated hydrocarbon like trichloroethylene, or trichlorotrifluoethylene, alcohols like ethylene glycol or glycerine, and fluorocarbons like F-113 or F-11. The composition of the non-oxidizing atmosphere can optionally be selected in accordance with the composition of the optical glass, composition of the thin film to be coated on the thermal processing jig and the press mold, temperature and time needed for thermally deforming optical glass, and the shape of optical glass preform.

Another aspect of the invention is to provide a novel optical glass preform whose one surface is substantially the transcribed surface transcribed from the optical surface of the second thermal processing jig coated with a chemically stable film and the other surface being free. The produced optical glass preform has extremely high surface quality and surface accuracy, where the preform is not only usable as the preform of glass optical element produced by recurrent heating processes, but it can also effectively be used for composing high-precision glass optical elements.

BRIEF DESCRIPTION OF THE DRAWINGS

FIG. 7 illustrates another embodiment of the apparatus for manufacturing the glass optical element related to the invention.

DESCRIPTION OF THE PREFERRED EMBODIMENTS

Figure 1:
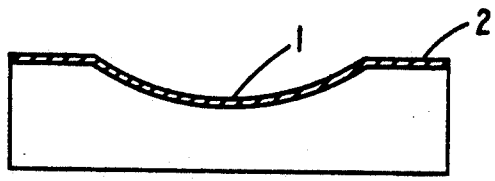
FIG. 1 illustrates a sectional view of a thermal processing jig and a press mold used for embodying the invention.
Figure 2:
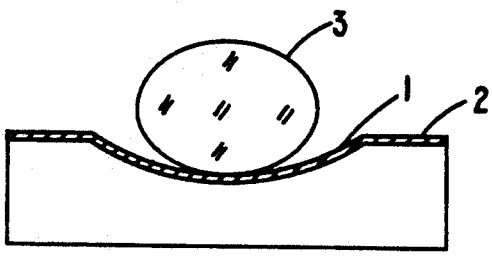
FIG. 2 illustrates the sectional view of an embodiment of the invention designating the optical glass placed on the thermal processing jig.
Figure 3:
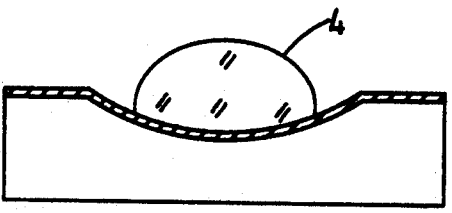
FIG. 3 illustrates the sectional view of an embodiment designating the thermally deformed optical glass.
Figure 4:
FIG. 4 illustrates the sectional view of the optical glass preform embodied by the invention.
Figure 5:
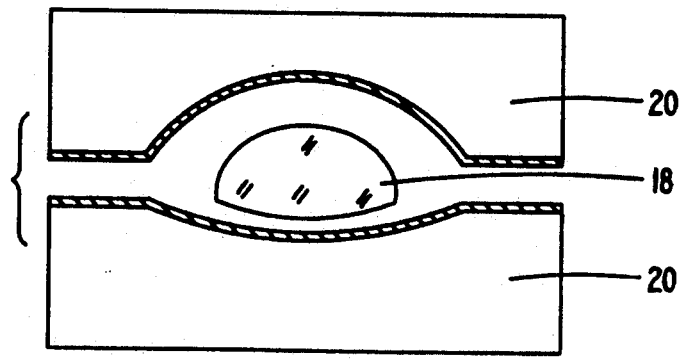
FIG. 5 illustrates the sectional view of an embodiment of the press molding process executed for producing the optical glass preform using the press mold of the invention.

FIG. 1 illustrates a sectional view of a thermal processing jig and a press mold used for embodying the invention. The thermal processing jig 16 and the press mold 20 (in FIG. 6) are respectively completed by coating chemically stable film 2 over the optical surface 1 of the substrate prepared in the desired shape and surface roughness. The thin film 2 may comprise either noble metal or tungsten or tantalum or rhenium or hafnium or an alloy of at least two of these elements. FIG. 2 illustrates the optical glass 3 placed on and heated by the thermal processing jig 16. FIG. 3 illustrated that the optical glass 3 is thermally deformed on the thermal processing jig 16. FIG. 4 illustrates the sectional view of the optical glass preform, in which the portion of the optical glass coming into contact with the optical surface 1 of the thermal processing jig 1 makes up the transcribed surface 5 as a result of the thermal deformation of the optical glass 3 itself, whereas the portion out of contact with the optical surface 1 of the thermal processing jig 16 forms free surface 4. FIG. 5 illustrates that the optical glass preform 18 is thermally molded by the press mold 20.

Figure 6:
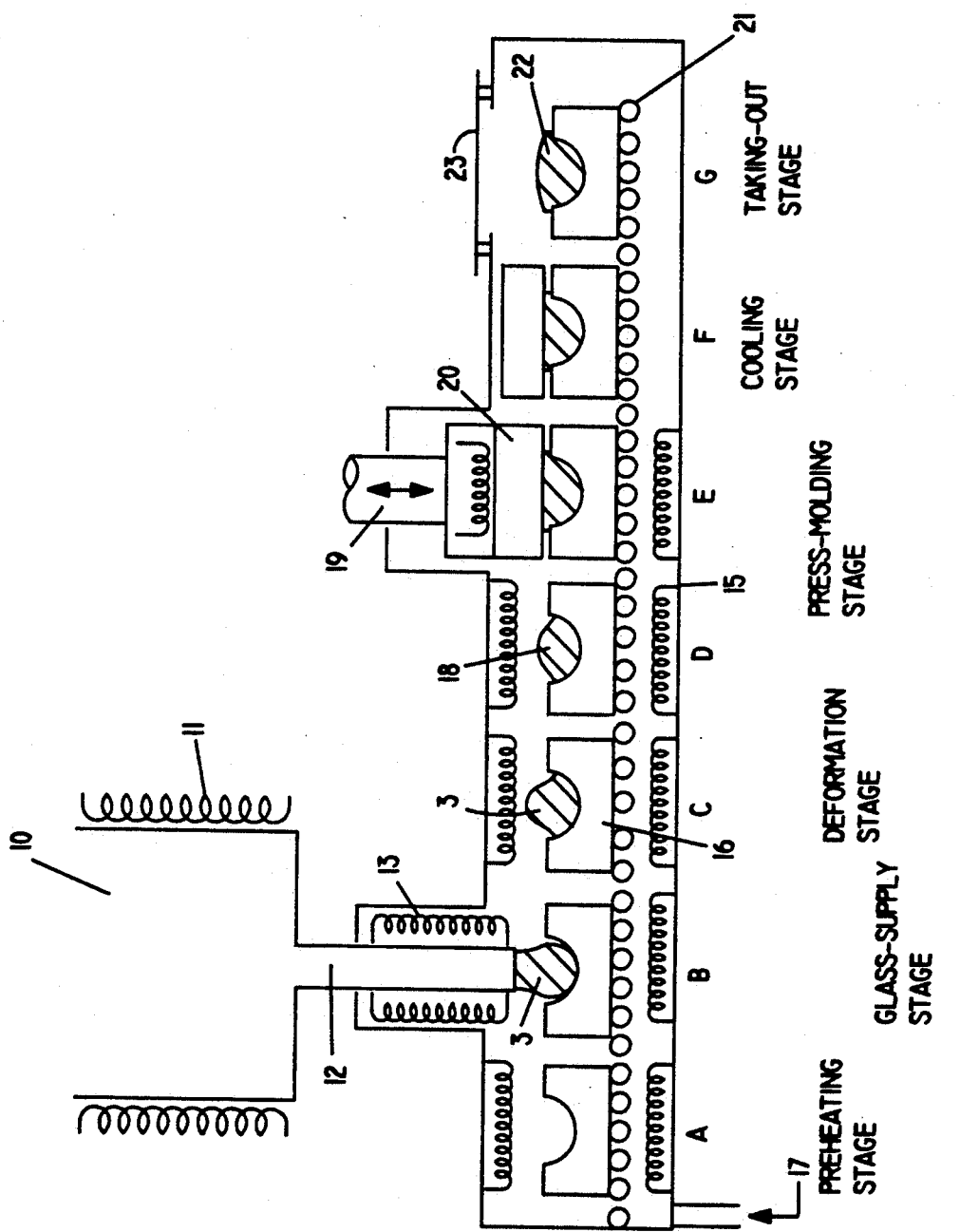
FIG. 6 illustrates the sectional view of an embodiment of the apparatus for manufacturing the glass optical elements related to the invention.

Referring now to FIG. 6, an embodiment of the invention is described below.

The optical glass 3 is thermally deformed and press-molded by applying the production apparatus after completing the adjustment of the gas atmosphere to the desired level by feeding gas through the gas inlet 17 and internal temperature using the heater 15. The production apparatus is composed of the preheating stage A, glass supply stage B, thermal deformation stages C and D, press-molding stage E, cooling stage F, and extrusion stage G, respectively. The thermal processing jig 16 is transferable on the roller 21 inside of the production apparatus. The heater 11 thermally melts the optical glass in the tank 10. The heater 13 controls temperature of the nozzle 12 which drips the predetermined weight of optical glass 3 onto the thermal processing jig 16 which is preliminarily heated in the pre-heating stage A at the position corresponding to the glass supply stage B. When the thermal deformation stage C is entered, the optical glass 3 is heated and roughly shaped on the thermal processing jig 16, which is further heated in the thermal deformation stage D before completing the production of the optical glass preform 18 having proper shape shown in FIG. 4. When the press molding stage E is entered, the optical glass preform 18 is continuously heated and pressed by the cylinder 19 of the press mold 20 having the predetermined shape and surface roughness. After thermally being pressed and molded, the glass optical element 22 heated by the press mold. 20 and the thermal processing jig 16 is cooled in the cooling stage F. The cooled glass optical element 22 is eventually taken out from the outlet 23 in the taking out stage G.

Referring now to FIG. 7, another embodiment of the invention is described below.

After completing the adjustment of gas atmosphere to the predetermined level by feeding gas through the gas inlet 17 and the internal temperature using the heater 15, the optical glass 3 is thermally deformed and press-molded by means of the production apparatus. The production apparatus is composed of the preheating stages A' and B', glass supply stage C', thermal deformation stage D', replacing stage E' for replacing optical glass preform 18 onto the press mold 20, press-molding stage F', cooling stage G', and extrusion stage H', respectively. The thermal processing jig 16 and the press mold 20 are transferred into the production apparatus by means of the internal roller 21. The heater 11 thermally melts the optical glass 3 inside of the tank 10. Another heater 13 controls temperature of the nozzle 12 which drips the predetermined weight of optical glass 3 onto the first jig 24 provided outside of the production apparatus. Immediately after completing the dripping of optical glass 3, the first thermal processing jig 24 is introduced inside of the production apparatus. Next, the optical glass 3 is inverted together with the first thermal processing jig 24. The first thermal processing jig 24 drips the melted optical glass 3 onto the second thermal processing jig (preliminarily heated in the preheating stages A' and B') in the following glass supply stage C'. When the thermal deformation stage D' is entered, the optical glass 3 is heated to complete the production of the optical glass preform 18 having proper shape shown in FIG. 4.

When the replacing stage E' is entered, the optical glass preform 18 is replaced onto the preliminarily heated press mold 20. Using the preheated press mold 20 (not shown), the optical glass preform 18 is thermally pressed and molded by the cylinder 19 of the press mold 20 having the predetermined shape and surface roughness in the press molding stage El. After completing the press-molding process, the cooling stage G' is entered, in which the glass optical element 22 held by the press mold 20 and the thermal processing jig 16 is cooled. Finally, the cooled glassy optical element 22 is taken out from the outlet 23 in the taking out stage H'.

EXAMPLE 1

First, a concave optical surface 1 having 20 Mm of radius of curvature was formed on a super hard alloy (WC-5TiC-8Co) body as a substrate of the thermal processing jig 16. The concave surface 1 was then wrapped for about an hour with extremely fine diamond powder for the purpose of completing mirror surface having about 25 Å (RMS) of the surface roughness. The thermal processing jig 16 was completed after the mirror surface was coated with thin film 2 composed of the alloy of platinum, iridium, and osmium (Pt-Ir-Os) by sputtering process.

The optical glass 3 was then thermally deformed by means of the production apparatus shown in FIG. 6. The optical glass 3 was melted in the tank 10 with the heater 11 at 1,100° C. of temperature. Under the control of temperature of the nozzle 12 at 800° C. with the heater 13, about 2 grams of melted optical glass 3 was then dripped from the nozzle 12 onto the thermal processing jig 16 (preliminarily heated at 600° C. in the preheating stage A) at the position corresponding to the glass supply stage B, as shown in FIG. 2. The optical glass 3 was glass composed of barium boric silicide, and was formulated with 30% by weight of silica ($SiO_2$), 50% by weight of barium oxide (BaO), 15% by weight of boric acid ($B_2O_3$), and minimum amount of impurities for the rest. For the purpose of maintaining a nitrogenous atmosphere, a flow of 20 liters per minute of nitrogen gas was continuously fed to the production apparatus. The optical glass 3 was then thermally processed on the thermal processing jig at 640° C. with the heater 15 during the thermal deformation stages C and D for 10 minutes. Immediately after completing those thermal processes, the optical glass 3 was cooled in the cooling stage F by skipping the press molding stage E. When temperature of the optical glass 3 lowered to 300° C., the cooled optical glass preform 18 shown in FIG. 4 was taken out.

The optical glass preform 18 produced by executing the above processes had free surface 4 on one-side of surface and transcribed surface 5 on the other side of surface which was transcribed from the optical surface 1 of the thermal processing jig 16. The free surface 4 and the transcribed surface 5 respectively had optical mirror surfaces which proved to be about 30Å and about 20Å (RMS) of the surface roughness without incurring even the minimal concave or convex or scratch at all. The produced optical glass preform 18 had a maximum of two the Newton's rings and a maximum of one-fifth of aspherical index in the surface accuracy of the transcribed surface 5. This proved that extremely high surface quality and surface accuracy were eventually achieved.

EXAMPLE 2

First, a concave optical surface 1 having 20 Mm of radius of curvature was formed on a super hard alloy (WC-5TiC-8Co) body as a substrate of the thermal processing jig 16. The concave surface 1 was then wrapped for about an hour with extremely fine diamond powder for the purpose of completing mirror surface having about 25Å (RMS) of the surface roughness. The thermal processing jig 16 was completed after the mirror surface was coated with thin film 2 composed of platinum, iridium, and osmium (Pt-Ir-Os) by sputtering process. Using the same process as was done for manufacturing the thermal processing jig 16, a pair of press molds 20 each having concave optical surface with 200 Mm of radius of curvature were produced after being coated with thin film 2 composed of the alloy of platinum, iridium, and osmium.

Optical glass 3 was thermally deformed and press-molded by means of the production apparatus shown in FIG. 6. The optical glass 3 was melted in the tank 10 at 1,200° C. with the heater 11, and then, under the control of temperature of the nozzle 12 at 900° C. with the heater 13, about 1 gram of the optical glass 3 was dripped from the nozzle 12 onto the thermal processing jig 16 (preliminarily heated at 740° C. in the preheating stage A) at the position corresponding to the glass supply stage B. As shown in FIG. 2, optical glass 3 was then mounted on the thermal processing jig 16. The optical glass 3 was composed of 30% by weight of silica ($SiO_2$), 50% by weight of barium oxide, 15% by weight of boric acid, and minimal amount of impurities for the rest. For the purpose of maintaining gaseous atmosphere flow of gas blended with 20 liters per minute of nitrogen gas and 2 liters per minute of hydrogen gas was continuously fed to the production apparatus through the gas inlet 17. During the thermal deformation stages C and D, the optical glass 3 was thermally processed on the thermal processing jig 16 with the heater 15 at 740° C. for 10 minutes before being completed to the optical glass preform 18. The optical glass preform 18 held by the thermal processing jig 16 was transferred to the molding stage E by means of the roller 21, and then molded with the press cylinder 19 equipped with the press mold 20 at 620° C. of the molding temperature for 2 minutes by applying 30 kg/cm² of pressure. Immediately after completing the press molding process, the glass optical element 22 held by the press mold 20 and the thermal processing jig 16 was transferred to the cooling stage F by means of the roller 21, and then gradually cooled. When temperature of the glass optical element 22 lowered to 300° C. to permit the entry into the taking out stage G, the glass optical element 22 was taken out from the outlet 23 to eventually complete the production of the glass optical element 22 shown in FIG. 6.

The glass optical element 22 completed from those sequential processes mentioned above had perfect optical mirror surface having about 25Å (RMS) of the surface roughness on the press-molded surface without incurring even the minimal concave or convex surfaces or scratches at all. The completed glass optical element 22 had a maximum of two of the Newton's ring and a maximum of one-fifth of aspherical index in the surface accuracy. This proved that extremely high optical performance characteristic was eventually achieved.

EXAMPLE 3

First, a concave having 15 mm of radius of curvature was formed on a carbon body as the first thermal processing jig 24. Another concave optical surface 1 having 45 mm of radius of curvature was formed on a austenite steel (SUS 316) body as the substrate of the second thermal processing jig 16. The optical surface 1 was then wrapped for about an hour with extremely fine diamond powder for the purpose of completing mirror surface having about 30Å (RMS) of the surface roughness. The second thermal processing jig. 16 was completed after the mirror surface was coated with thin film 2 composed of the alloy of rhodium, gold, and tungsten (Rh-Au-W) by ion-plating process. Applying the same process as was applied for manufacturing the second thermal processing jig 16, a pair of press molds 20 were also completed being coated with thin film 2 composed of the alloy of rhodium, gold, and tungsten (Rh-Au-W) over the surface of hard metal which was processed into concave optical surface having 150 Mm of radius of curvature. The optical glass 3 was formulated with 8% by weight of zirconia ($ZrO_2$), 30% by weight of lanthanum oxide ($La_2O_3$), 42% by weight of boric acid ($B_2O_3$), 10% by weight of calcium oxide (CaO), and minimal amount of impurities for the rest.

As shown in FIG. 7, the interior of the production apparatus was filled with a halogenated atmosphere composed of vaporized trichlorotrifluoroethylene($C_2Cl_3F_3$) which was fed to the production apparatus through the gas inlet 17 with the support of nitrogen gas serving as carrier. Optical glass was melted in the tank 10 at 1,350° C. by applying the heater 11. Under the control of temperature of the nozzle 12 at 950° C. with the heater 13, about 4 grams of the melted optical glass 3 was dripped from the nozzle 12 onto the first thermal processing jig 24 set outside of the production apparatus. Immediately after completing the dripping, the first thermal processing jig 24 was introduced in the production apparatus, and then inverted together with the optical glass 3. When the glass supply stage C' was entered, the optical glass 3 was delivered to the second thermal processing jig 16 which was preliminarily heated at 830° C. with the heater 15 during the preheating stages A' and B'. During the thermal deformation stage D', the optical glass 3 was heated at 830° C. for 10 minutes to the optical glass preform 18 having proper shape shown in FIG. 4. Next, when the replacing stage E' was underway, the optical glass preform 18 was replaced from the second thermal processing jig 16 onto the press mold 20 which was preliminarily heat at 680° C. (not shown). When the following press molding stage F' was underway, the optical glass preform 18 was molded by being thermally pressed with the cylinder 19 equipped with the press mold 20 at 680° C. for 2 minutes under 30 kg/cm² of pressure. Then, when the cooling stage G' was entered, the optical glass preform 18 held by the press mold 20 was gradually cooled at a rate of 20° C. per minute until temperature lowered to 400° C. The cooled glass optical element 22 was finally taken out from the outlet 23 in the final taking out stage H'.

The glass optical element 22 completed from the above sequential processes had perfect mirror surface having about 25Å (RMS) of the surface roughness on the press-molded surface without incurring even the minimal concave or convex or scratch at all. The completed glass optical element 22 had a maximum of two of the Newton's ring and a maximum of one-fifth of aspherical index in the surface accuracy. This proved that extremely high optical performance characteristic was securely achieved.

EXAMPLE 4

First, a concave having 15 mm of radius of curvature was formed on a carbon body as the first thermal processing jig 24. Another concave optical surface having 145 mm of radius of curvature was formed on a cermet alloy body composed of TiC-10Mo-9Ni as the substrate of the second thermal processing jig 16. The optical surface 1 was then wrapped for about an hour with extremely fine diamond powder for the purpose of completing mirror surface having about 25Å (RMS) of the surface roughness. The second thermal processing jig 16 was completed after the mirror surface was coated with thin film 2 composed of the alloy of platinum, tantalum, and rhenium (Pt-Ta-Re) by sputtering process. Applying the same process as was applied for manufacturing the second thermal processing jig 16, a pair of press molds 20 were completed by being coated with thin film 2 composed of the alloy of rhodium, gold, and tungsten (Rh-Au-W) over the surface of hard metal which was processed into concave optical surface having 250 mm of radius of curvature by applying ion-plating process. The optical glass 3 was formulated with 65% by weight of silica ($SiO_2$), 9% by weight of potassium oxide ($K_2O$), 10% by weight of boric acid ($B_2O_3$), 10% by weight of sodium oxide ($Na_2O$), and minimal amount of impurities for the rest.

As shown in FIG. 7, the interior of the production apparatus was filled with hydrocarbon atmosphere containing a flow of gas blended with 20 liters per minute of argon and 1 liter per minute of ethylene ($C_2H_4$) by feeding the flow of gas to the production apparatus through inlet 17. Optical glass 3 was melted in the tank 10 at 1,350° C. with the heater 11. Under the control of temperature of the nozzle 12 at 920° C. with the heater 13, about 3 grams of optical glass 3 was dripped from the nozzle 12 onto the first thermal processing jig 24 set outside of the production apparatus. Immediately after completing the dripping, the first thermal processing jig 24 was introduced in the production apparatus, and then inverted together with the optical glass 3. When the glass supply stage C' was entered, the inverted optical glass 3 was delivered to the second thermal processing jig 16 which was preliminarily heated at 780° C. during the preheating stages A' and B'. While the thermal deformation stage D' was underway, inventors heated the optical glass 3 was heated at 780° C. for 10 minutes to the optical glass preform 18 having proper shape shown in FIG. 4. When the replacing stage E' was entered, the optical glass preform 18 was replaced from the second thermal processing jig 16 onto the press mold 20 which was preliminarily heated at 680° C. (not shown). When the following press-molding stage F' was entered, the optical glass preform 18 was molded by being thermally pressed with the cylinder 19 equipped with the press mold 20 at 680° C. for 2 minutes under 30 kg/cm² of pressure. Next, when the cooling stage G' was entered, the optical glass preform 18 held by the press mold 20 was cooled at a rate of 30° C. per minute until temperature lowered to 450° C. Finally, when the extrusion stage H' was entered, the cooled glass optical element 22 was taken out from the outlet 23 of the production apparatus.

The glass optical element 22 completed from those processes mentioned above had perfect mirror surface having about 25Å (RMS) of the surface roughness on the press-molded surface without incurring even the minimal concave or convex or scratch at all. The completed glass optical element 22 had a maximum of two of the Newton's ring and a maximum of one fifth of aspherical index in the surface accuracy. This proved that extremely high optical performance characteristic was securely achieved.

EXAMPLE 5

First, a concave surface having 25 mm of radius of curvature was formed on a boron nitride (BN) body as the substrate of the first thermal processing jig 24. Another concave optical surface 1 having 45 mm of radius of curvature was formed on a silicon body as the substrate of the second thermal processing jig 16. The optical surface 1 was then wrapped for about an hour with extremely fine diamond powder and completed mirror surface having about 25Å (RMS) of the surface roughness. The second thermal processing jig 16 was completed after the mirror surface was coated with thin film 2 composed of rhodium, gold, and tungsten (Rh-Au-W) by sputtering process. Applying the same process as was applied for manufacturing the second thermal processing jig 16, the press mold 20 was completed by being coated with thin film 2 composed of the alloy of platinum, iridium, and osmium (Pt-Ir-Os) over the concave optical surface composed of cermet (TiC-10Mo-9Ni) having 100 Mm of radius of carvature. The optical glass 3 was formulated with 52% by weight of silica ($SiO_2$), 6% by weight of potassium oxide ($K_2O$), 35% by weight of lead oxide (PbO), 5% by weight of sodium oxide ($Na_2O$), and minimal amount of impurities for the rest.

As shown in FIG. 7, the interior of the production apparatus was filled with atmosphere composed of flow of the blend of 20 liters per minute of helium gas and 2 liters per minute of carbon dioxide by being fed to the production apparatus through the gas inlet 17. Next, optical glass 3 was melted in the tank 10 at 1,250° C. by the heater 11. Under the control of temperature of the nozzle 12 at 780° C. with the heater 13, about 5 grams of optical glass 3 was dripped from the nozzle 12 onto the first thermal processing jig 24 set outside of the production apparatus. Immediately after completing the dripping, the first thermal processing jig 24 was introduced in the production apparatus, and then inverted, or made upside down, together with the optical glass 3. When the glass supply stage C' was underway, the inverted optical glass 3 was delivered to the second thermal processing jig 16 which was preliminarily heated at 610° C. by the heater 15 during the preheating stages A' and B'. Next, when the thermal deformation stage D' was entered, the optical glass 3 was heated at 610° C. for 5 minutes to the optical glass preform 18 having proper shape shown in FIG. 4. When the replacing stage E' was entered, the optical glass preform 18 was replaced from the second thermal processing jig 16 onto the press mold 20 which was preliminarily heated at 550° C. (not shown). When the following press-molding stage F' was entered, the optical glass preform 18 was molded being thermally pressed using the cylinder 19 equipped with the press mold 20 at 550° C. for a minute under 80 kg/cm² of pressure. When the cooling stage G' was underway, the glass optical element 22 held by the press mold 20 was cooled at a rate of 15° C. per minute until temperature of the glassy optical element 22 lowered to 330° C. Finally, the cooled glass optical element 22 was taken out from the outlet 23 during the final taking out stage H'.

The glass optical element 22 completed from those sequential processes mentioned above had perfect mirror surface having about 25Å (RMS) of the surface roughness on the press-molded surface without incurring even the minimal concave or convex or scratch at all. The completed glass optical element 22 had a maximum of two Newton's rings and a maximum of one fifth of aspherical index in the surface accuracy. This proved that extremely high optical performance characteristic was securely achieved.

It should expressly be understood that the composition of optical glass, composite materials of the first and second thermal processing jigs, press mold, and thin film coated over these thermal processing jigs and the press mold, the conditions of thermal deformation including temperature, time, and atmosphere, shapes of the optical glass preform,, or the conditions including the method of replacing the optical glass from the first thermal processing jig onto the second thermal processing jig by inverting the optical glass on the first thermal processing jig, shall by no means be confined to those embodiments described above.

What is claimed is:

1. A method of manufacturing a glass optical lens preform comprising the steps of:
   placing glass in the form of a gob or lump on a surface of a thermal processing mold in a non-oxidizing atmosphere, said surface being a mirror surface coated with a chemically stable think film; and
   heating the thermal processing mold in the non-oxidizing atmosphere so that said glass is thermally deformed into a shape which has a transcribed surface transcribed from said mirror surface at a portion contacting said mirror surface and a free surface formed by surface tension of the thermally deformed glass at a portion not contacting said mirror surface; and
   cooling the thermally deformed glass in the non-oxidizing atmosphere to obtain an optical glass preform having said transcribed surface at the portion contacting said mirror surface and said free surface at the portion not contacting said mirror surface.

2. A method of manufacturing a glass optical lens preform comprising in the steps of:
   placing glass in the form of a gob or lump on a surface of a thermal processing mold in a non-oxidizing atmosphere, said surface being a mirror surface coated with a chemically stable thin film which comprises at lest one member selected from the group consisting of a nobel metal, tungsten, tantalum, rhenium and hafnium;
   heating the thermal processing mold in the non-oxidizing atmosphere so that said glass is thermally deformed into a shape which has a transcribed surface transcribed from said mirror surface at a portion contacting said mirror surface and a free surface formed by surface tension of the thermally deformed glass at a portion not contacting said mirror surface; and
   cooling the thermally deformed glass in the non-oxidizing atmosphere to obtain an optical glass preform having said transcribed surface at the portion contacting said mirror surface and said free surface at the portion not contacting said mirror surface.

* * * * *